UNITED STATES PATENT OFFICE.

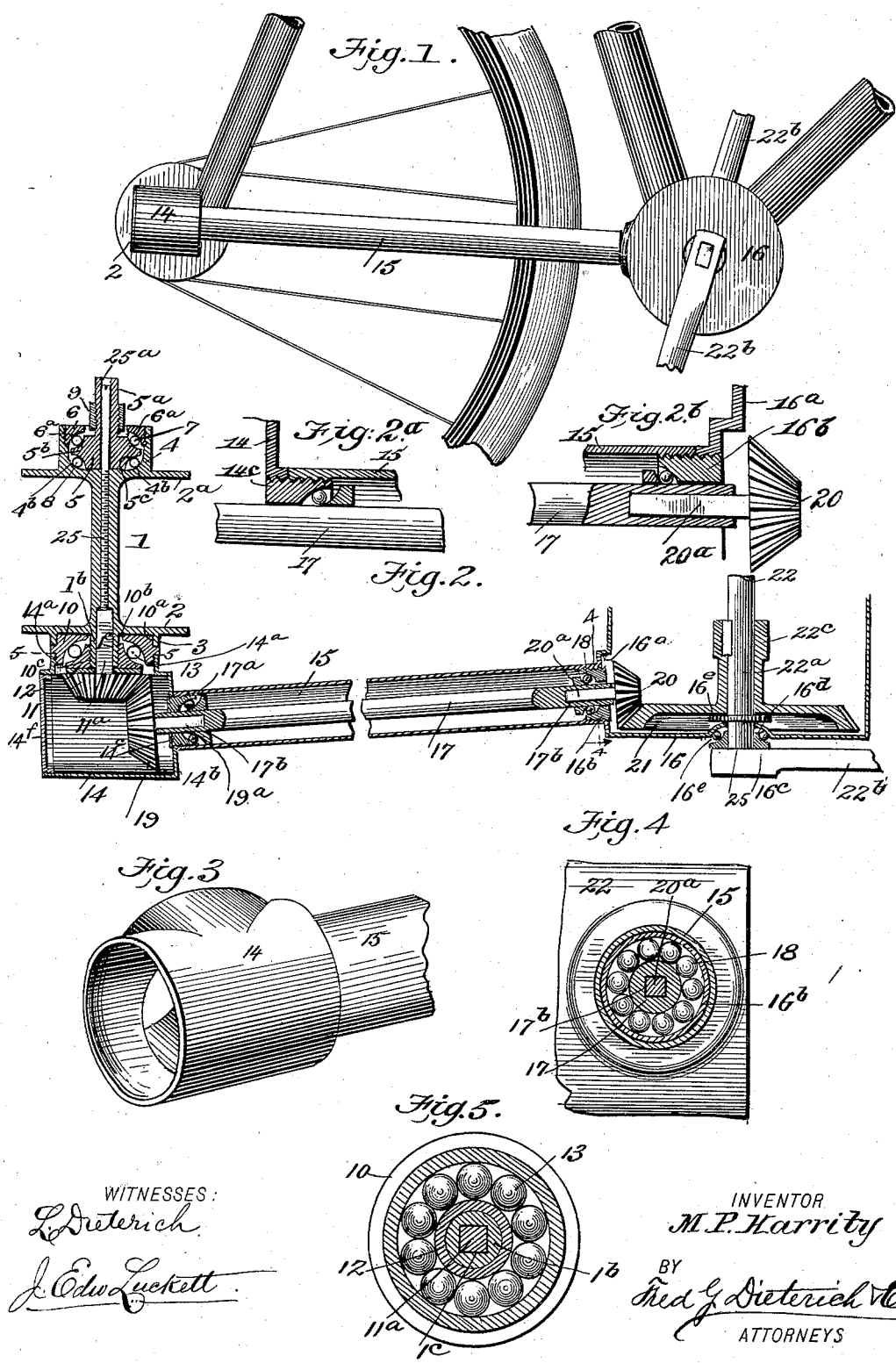

MICHAEL P. HARRITY, OF CLINTON, MASSACHUSETTS.

BICYCLE-GEARING.

SPECIFICATION forming part of Letters Patent No. 609,344, dated August 16, 1898.

Application filed March 2, 1897. Serial No. 625,781. (No model.)

*To all whom it may concern:*

Be it known that I, MICHAEL P. HARRITY, residing at Clinton, in the county of Worcester and State of Massachusetts, have invented a new and useful Improvement in Bicycle-Gearing, of which the following is a specification.

This invention relates to improvements in bicycle drive mechanisms; and it primarily has for its object to provide a drive-gearing of a very simple and economical construction adapted to be readily assembled or detached and which has the parts arranged to receive interchangeable drive-gears of different diameters, whereby to change the speed of the machine.

This invention also has for its object to provide a simple detachable gear mechanism and detachable housing therefor so arranged that the garments of the rider cannot become entangled therewith.

With other objects in view, which will hereinafter appear, the invention consists in novel features of construction and combination of parts, such as will be first described in detail, and then be specifically pointed out in the appended claims, reference being had to the accompanying drawings, in which—

Figure 1 is a side elevation of a portion of a bicycle with my improvements applied. Fig. 2 is a horizontal section taken on the line 2 2 of Fig. 1. Figs. $2^a$ and $2^b$ are enlarged detail views illustrating the connection of the parts 16, 14, and 15. Fig. 3 is a detail view of the removable cap-plate for the drive-axle end. Fig. 4 is a transverse section taken on the line 4 4 of Fig. 2. Fig. 5 is a similar view on the line 5 5 of Fig. 2.

Referring to the drawings, 1 indicates the main drive-hub, to which the spoke-disks 2 and $2^a$ are fixedly connected, one of which, 2, has a short annular rim 3 on its outer face, while the other, $2^a$, has a projecting housing 4, as most clearly shown in Fig. 2. The housing 4 is held to turn on a non-rotary bearing-block 5, which has a sleeve $5^a$ extended through a detachable cap-piece 6, screwed into the end of the said housing 4 and provided with annular ball-bearing portions $6^a$, between which and the ball-grooves $5^b$ of the block 5 is held a series of balls 7, such block also having a groove $5^c$ on its inner face to receive a series of balls 8, which also seat on the annular bearing-plate $4^b$ of the housing. To provide for an accurate adjustment of the blocks 5, the shank $5^a$ has a screw-washer 9.

10 indicates a bearing-disk having a concave inner face and an exterior annular groove $10^a$, whereby it can be placed over the flange 3 of the disk 2, it also having a central aperture $10^b$ for the passage of the end $1^b$ of the shaft or hub 1, it also having an exterior thread $10^c$. The end $1^b$ of the shaft has a non-circular socket $1^c$ to receive the non-circular shank $11^c$ of the detachable bevel-gear 11, which when in position holds in place a bearing-washer 12, fixedly connected to the shaft end $1^b$, between which and the disk 10 is held a series of bearing-balls $14^a$.

14 indicates a detachable housing having a cylindrical body closed at the outer end by a removable cap-piece $14^f$ and provided at one face with an internally-threaded hub, which receives the threaded portion of the member 10.

15 indicates a tubular housing which is detachably connected at its outer end to the bearing-block $16^b$, secured in the end of the crank-axle housing, presently referred to.

17 indicates the drive-shaft, which carries at each end a fixed bearing $17^b$, between which and the bearing-blocks $14^c$ and $16^b$ are held bearing-balls 18, as shown. Each end of the shaft has a non-circular socket to receive the shanks $19^a$ and $20^a$ of the bevel-gears 19 20, one of which is held in mesh with the drive-shaft gear 11 and the other, 20, with the master-gear 21, fixedly held to turn with the crank-axle 22, its face being concaved to provide clearance for the inwardly-projecting concaved portion of the housing 16, between which and the bearing-disk adjustably held on the crank-axle is seated a series of balls $16^e$.

In practice the end $22^a$ of the axle is slipped through the housing 16 and the balls and disk $16^d$ fitted in place before the crank is applied.

The master-gear has a long sleeve $22^c$ and is held in position by a collar 23, keyed to the axle.

To provide for a careful adjustment of the gear 11, an adjusting-screw 25 is fitted in the shaft 1, having a driver-receiving head 25ª. By forcing the screw inward the gear 11 can be held in a close engagement with its mate.

From the foregoing description, taken in connection with the drawings, it is thought the complete operation and the advantages of my invention will be readily understood. The drive-gearing is held inclosed, dust-proof, and out of the way of the clothes of the rider. The housing and the gear parts are so simply joined that they can be readily taken apart when it is desired to change the gearing for cleaning or other purposes.

It is obvious slight changes in the details of construction may be made without departing from the scope of the appended claims.

Having thus described my invention, what I claim, and desire to secure by Letters Patent, is—

1. A gearing for bicycles, comprising the crank-axle provided with a master gear-wheel, a shaft having a gear-wheel at each end, one of said gear-wheels being held in mesh with said master gear-wheel, the other being held in mesh with a gear-wheel detachably secured to the rear-wheel hub, and means for adjusting the said detachable gear consisting of a screw provided with a driver-receiving head fitted within the said rear-wheel hub.

2. A gearing for bicycles, comprising the crank-axle, a master-gear beveled gear-wheel provided with a sleeve which is held in position on said crank-axle by a collar, a shaft provided at each end with a beveled gear-wheel, a detachable beveled gear-wheel adjustably mounted on the rear-wheel hub, a bearing-disk on said rear-wheel hub, having a concave inner face and an exterior annular groove, an opening for the said hub, the lower exterior portion of the disk being threaded, and a housing for said gearing, the portion 14 of which is attached to said disk and is provided with a removable cap, a tubular portion, inclosing the driving-shaft, having one end connected to said portion 14, the other end being connected to a portion provided with a concave face inclosing the said master gear-wheel.

3. A gearing for a bicycle, comprising the crank-axle provided with a beveled gear-wheel, a shaft carrying at each end a beveled gear-wheel, one of which meshes with the said gear-wheel on the crank-axle, the other being adapted to mesh with an adjustable beveled gear-wheel detachably secured to the rear-wheel hub, a housing for said gearing, a stationary bearing-block mounted on said rear-wheel hub, provided with a sleeve, a housing mounted to turn upon said bearing-block and a cap-piece surrounding the said sleeve, securely attached to the end of the said housing.

4. The combination with the crank-axle, the drive-shaft 17 geared therewith, said shaft 17 having a bevel-gear 19, and the housing 16, of the drive-hub 1, having a detachable gear 11 adapted to mesh with the gear 19, the disk 2, fixedly secured to the drive-hub, the disk 10, bearings 13, the housing 14, detachably connected to the disk 10, and the housing 15, all being arranged as shown and for the purposes described.

5. A gearing for bicycles, comprising the crank-axle provided with a master gear-wheel, a shaft provided at each end with gear-wheels, a gear-wheel detachably mounted on the rear-wheel hub by means of a shank, which is fitted in a socket in the said hub, and means for adjusting the said gear-wheel consisting of a rod extending through said hub, the outer end of which is provided with driver-receiving head.

MICHAEL P. HARRITY.

Witnesses:
THOMAS F. LARKIN,
DAVID I. WALSH.